(12) United States Patent
Norris et al.

(10) Patent No.: US 9,772,540 B2
(45) Date of Patent: Sep. 26, 2017

(54) AUTOFOCUS FOR IMAGING SYSTEM (71) Applicant: BIO-TEK INSTRUMENTS, INC., Winooski, VT (US)

(72) Inventors: Ben Norris, Williston, VT (US); James Piette, Winooski, VT (US); Benjamin Knight, Shelburne, VT (US); Ross Piette, Essex Junction, VT (US); G. Gerard Gormley, Worcester, VT (US); Oleg Zimenkov, South Burlington, VT (US)

(73) Assignee: BIO-TEK INSTRUMENTS, INC., Winooski, VT (US)

( * ) Notice: Subject to any disclaimer, the term of this patent is extended or adjusted under 35 U.S.C. 154(b) by 0 days.

(21) Appl. No.: 15/206,756

(22) Filed: Jul. 11, 2016

(65) Prior Publication Data

US 2017/0013186 A1 Jan. 12, 2017

Related U.S. Application Data (60) Provisional application No. 62/190,547, filed on Jul. 9, 2015.

(51) Int. Cl.
*H04N 5/232* (2006.01)
*G03B 13/36* (2006.01)
*G03B 17/48* (2006.01)

(52) U.S. Cl.
CPC .............. *G03B 13/36* (2013.01); *G03B 17/48* (2013.01); *G03B 2215/0567* (2013.01)

(58) Field of Classification Search
CPC ......... G03B 17/48; G03B 13/36; H04N 5/232

USPC ........................................................ 348/345
See application file for complete search history.

(56) References Cited

U.S. PATENT DOCUMENTS

| 7,345,814 | B2 | 3/2008 | Yoneyama et al. | |
|---|---|---|---|---|
| 7,443,513 | B2* | 10/2008 | Rembe | G02B 21/0056 356/511 |
| 7,502,164 | B2 | 3/2009 | Lytle et al. | |
| 8,867,180 | B2 | 10/2014 | LePort | |
| 2007/0152130 | A1* | 7/2007 | Fomitchov | G02B 7/36 250/201.3 |
| 2010/0294746 | A1* | 11/2010 | Bann | B23K 26/0838 219/121.69 |
| 2011/0075151 | A1* | 3/2011 | Jeong | G01N 21/956 356/453 |
| 2012/0300194 | A1 | 11/2012 | Zimenkov et al. | |
| 2013/0094016 | A1* | 4/2013 | Knebel | G02B 21/241 356/124 |
| 2015/0226676 | A1* | 8/2015 | Nicolaides | G01N 21/9505 356/237.5 |
| 2015/0309297 | A1* | 10/2015 | Westphal | G02B 21/244 359/363 |
| 2017/0150055 | A1* | 5/2017 | Chung | H04N 5/23287 |

OTHER PUBLICATIONS

Qingxiang Li, et al., "Autofocus system for microscope", Opt. Eng., Jun. 2002, pp. 1289-1294, vol. 41, No. 6.

* cited by examiner

*Primary Examiner* — Usman Khan
(74) *Attorney, Agent, or Firm* — Sughrue Mion, PLLC (57) ABSTRACT

Non-image based autofocusing in an imaging system including an autofocus light source on a movable carriage variably positioned with offset in parallel to an optical axis of an objective.

13 Claims, 10 Drawing Sheets

AUTOFOCUS FOR IMAGING SYSTEM

CROSS-REFERENCE TO RELATED APPLICATION

This application is a non-provisional application of U.S. Provisional Application No. 62/190,547, filed on Jul. 9, 2015, in the U.S. Patent and Trademark Office, the, the disclosure of which is incorporated by reference in its entirety.

BACKGROUND

1. Field

Apparatuses and methods consistent with non-limiting embodiments of the present disclosure relate to non-image based autofocusing in an imaging system.

2. Description of the Related Art

Cellular biology increasingly relies on fully automated systems for efficiently collecting imaging data from multiple samples. Often, the samples are disposed in microplates having a large well capacity, such as ninety-six wells, 348 wells, or an even greater quantity of wells.

High magnification microscopy methods are commonly employed to observe and record images of cells disposed in the wells of the microplate. The cell images may be captured, for example, in a fluorescence mode, a bright field mode, or a phase contrast mode. Thereby, cell growth over time or cell reaction to stimulus over time may be continuously monitored.

A new style of microplate based instrument that combines an imaging mode with an analysis mode, while providing live cell environment for studying cells, is described in Zimenkov et al. (U.S. Pub. 2012/0300194), which illustrates (e.g., FIG. 11A) an imaging part of the instrument, the entire contents of which are incorporated herein by reference.

An important step in obtaining a proper microscopy image is the ability to focus a microscope objective on the sample disposed in the well of the microplate. In general, two methods of focusing the microscope objective are deployed in conventional automated systems: (1) image-based sensing and (2) position sensing, each of such methods having advantages and limitations.

In image-based sensing for focusing the microscope objective, a series of images is captured at various positions of the microscope objective relative to the bottom of the microplate well. That is to say, the microscope objective may be variously positioned closer to the microplate well or farther from the microplate well. Imaging may be performed at the various positions, and an optimal image is selected, for example, based on sharpness of features of interest.

In conventional automated systems, additional hardware is not required to implement the image-based sensing autofocus technique, thus increasing robustness of the automated system while reducing cost. However, a drawback of the image-based sensing autofocus technique is that additional time and additional exposure of the sample to radiation that may, for example, bleach fluorophores or damage living cells.

The position-based sensing for focusing of the microscope objective implements complex hardware (in addition to imaging hardware) to determine a reference reflecting surface, for example a bottom of a well of the microplate with subsequent offset for image capturing or, preferable, a well/fluid interface). Once the reference surface is determined, an image is captured with the microscope objective focused at the reference reflecting surface or some selected, but fixed for the experiment, offset from the reference reflecting surface.

In general, the position-based sensing autofocus technique executes more quickly than the aforementioned image-based sensing autofocus technique. Moreover, radiation employed for the position-based sensing autofocus technique is typically performed at a wavelength higher than radiation wavelengths used for imaging the samples, and therefore the position-based sensing autofocus technique is less likely to damage the sample.

Various hardware and software for implementing the position-based sensing autofocus technique are provided by, for example, Yoneyama et al. (U.S. Pat. No. 7,345,814) and LaPort (U.S. Pat. No. 8,867,180). As discussed therein, the position-based sensing autofocus technique relies upon a narrow beam or radiation—typically a laser, an LED or any other radiation source capable of producing a narrow beam would be acceptable—output via objective to the sample at an off axis position. The position and/or shape of reflected beam is analyzed by a position sensitive detector.

In another example, Li et al., "Autofocus System for Microscope," *Opt. Eng.* 41(6), 1289-1294 (Jun. 1, 2002), describes the theoretical background of a laser-based autofocus system for an infinity corrected microscope that uses symmetrical silicon photocell as a detection device.

Figure 1:
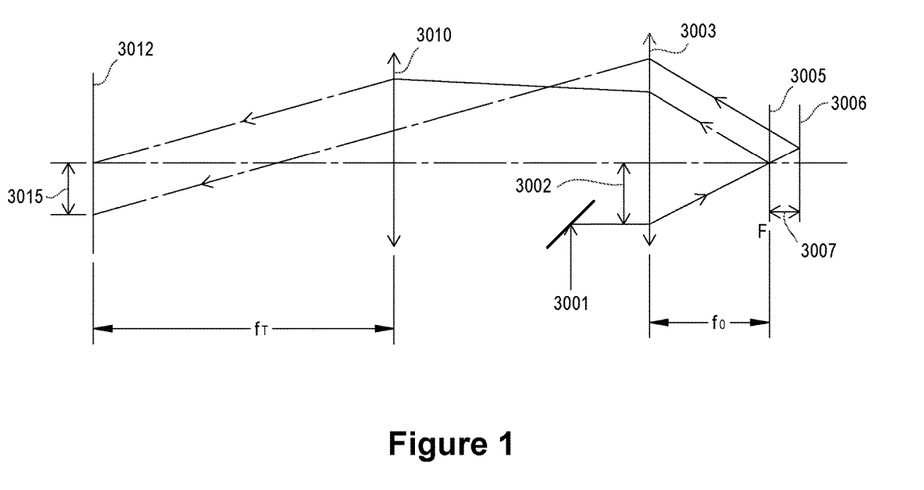
FIG. 1 illustrates a conceptual layout of a position-based autofocus system.

FIG. 1 illustrates a conceptual layout of the position-based autofocus system described in Li et al.

As illustrated in FIG. 1, an infinity corrected optics layout is presented with objective 3003, tube lens 3010, and position sensitive detector 3012, which may be a symmetrical silicon photocell. A narrow beam of light 3001, typically a laser, LED, or other source, is projected at an offset 3002 relative to an optical axis towards objective 3003. The beam 3001 is reflected by sample surface 3005. When the objective 3003 is focused on this sample surface 3005, the reflected beam reaches the position sensitive detector 3012 at an optical axis position. If the sample surface 3005 is offset from focus by offset 3007, the reflected beam will reach detector at a corresponding distance 3015 from the optical axis, as there is a direct correlation between offset 3007 in the sample space and offset 3015 on the position sensitive detector 3012. The position sensitive detector 3012 provides a signal proportional to the offset 3015. As a result, the autofocus process necessitates changing the position of the objective 3003 to maintain a constant signal from detector 3015 equal to the signal obtained from an optimally focused sample, from imaging quality standpoint.

An example of a commercial laser-based autofocus module is the Nikon Perfect Focus™ system, which is a complex laser-based device that controls focus of the microscope objective in real time. Such system, for example, may be incorporated with a standard microscope or imaging reader similar to that described in Zimenkov et al.

Figure 2:
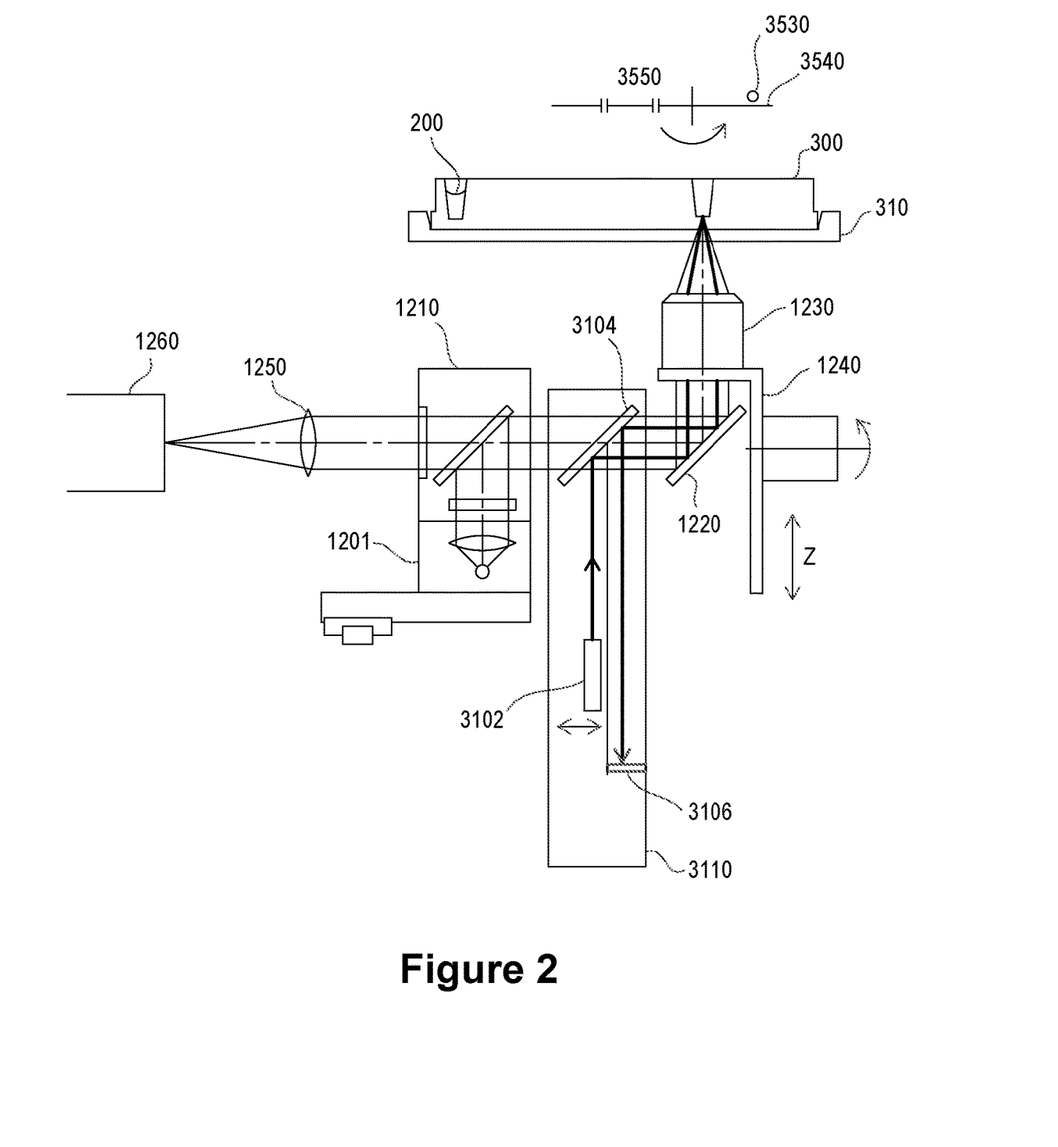
FIG. 2 illustrates conceptual incorporation of a laser-based autofocus module into an imaging reader.

FIG. 2 illustrates conceptual incorporation of a laser-based autofocus module into an imaging reader.

The laser-based autofocus module 3110 may be the Nikon Perfect Focus™ system, and the imaging reader may be the imaging system of Zimenkov et al.

The autofocus module 3110 may be disposed between an epi-fluorescence cube 1210 and an objective 1230. A charge-coupled device (CCD) 3106 may be used as a position sensitive detector. A laser 3102 may be a 870 nm laser and dichroic 3104 that introduces the laser into the objective should allow excitation radiation from epi cubes to a sample and emissions radiation from the sample to imaging detector 1260 to pass unhindered. A short pass dichroic 3104 with cut off wavelength of about 800 nm should reflect the 870 nm laser beam, but will pass all radiation below about 750 nm, namely the range sufficient for most fluorophores.

The optics of the autofocus module may be in line with standard imaging optics, and thus do not interfere with imaging functionality. As illustrated by the darkened portions, autofocus beams emitted to and reflected from the sample do not interfere with lightened lines indicating imaging beams emitted to and reflected from sample. Thus the objective's positioning relative to the sample may be performed in real time without delay or additional movements needed between autofocus and image taking, thereby improving processing speed.

However, additional space is necessary to configure such combined implementation, and additional hardware components are required in addition to hardware supporting the sample imaging functionality.

Another laser-based autofocus system is described in LaPort. As illustrated therein (e.g., FIG. 1), a mirror could be switched into the optical path during autofocus and removed during actual image capturing. The position sensitive detector may be used for autofocus while an image is captured camera.

Figure 3:
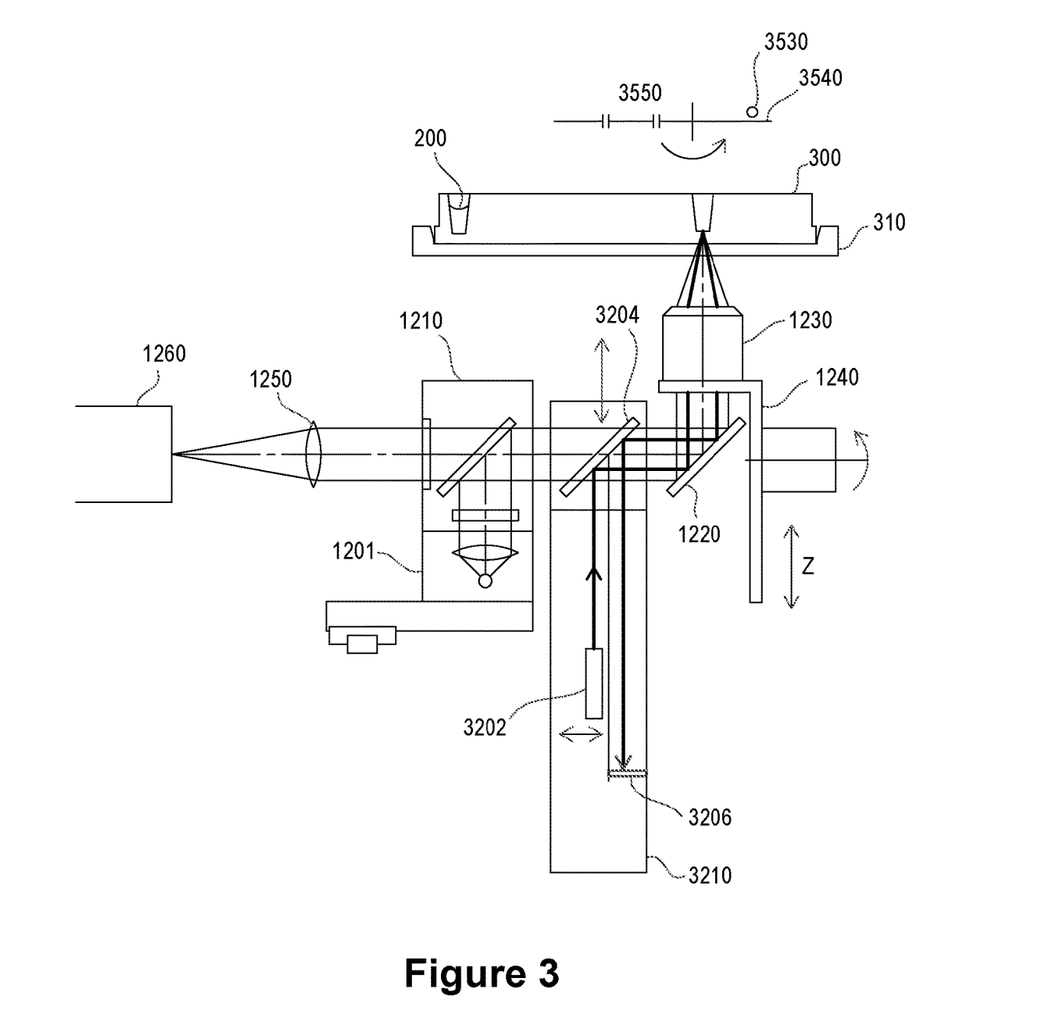
FIG. 3 illustrates conceptual incorporation of a laser-based autofocus module into an imaging reader.

FIG. 3 illustrates conceptual incorporation of a laser-based autofocus module into an imaging reader.

The laser-based autofocus module 3210 may be the system of LaPort, and the imaging reader may be the imaging system of Zimenkov et al.

The laser 3202 emits a beam towards objective 1230 via movable mirror 3204. After autofocus is performed with the assistance of the position sensitive detector 3206, the mirror 3204 is removed from the optical path and the sample is imaged. The switch from autofocus to image capturing is slower than that illustrated in FIG. 2, though the delay of a light mirror moved in and out of the optical path may be small.

Again, considerable additional space would be required to implement the configuration of FIG. 3, and new components in addition to the hardware supporting the imaging functionality would be required.

The envisioned autofocus systems described above employ a complex set of additional parts to that which is already present in conventional imaging systems. The extra space such systems demand presents a challenge for the designer of a dedicated microplate based imaging system similar to Zimenkov et al., as the microplate size sets the lowest limit on the system's size, but microplate size notwithstanding, implementing a compact unit that can be placed into a laminar flow hood or completely inside an incubator is a key design goal for a live cell microplate based imaging system. Moreover, additional spacing gaps between optical components for a laser autofocus subsystem may be unattractive from an overall design standpoint. Thus, an autofocus system accomplished without extra space in addition to the main sample imaging optical tract would be highly desirable.

SUMMARY

Aspects of non-limiting embodiments of the present disclosure relate to a position-based autofocus system configured in spacing reserved for conventional imaging components of an infinity based microscope system without necessitating additional axial gaps between components along an optical track.

Aspects of non-limiting embodiments of the present disclosure incorporate a narrow beam illumination module for implementing laser-based autofocusing with hardware for imaging functionality.

Aspects of non-limiting embodiments of the present disclosure enable convenient access to and upgrade of imaging system from conventional imaging systems having only image-based autofocus to a system employing positional sensing laser autofocus.

The embodiments described herein may overcome the above disadvantages and other disadvantages not described above. The embodiments described herein may exhibit the above advantages and other advantages not described above. However, the embodiments are not required to overcome the disadvantages described above or exhibit the advantages above, and an embodiment may not overcome any of the problems described above or exhibit the advantages discussed above.

According to an aspect of an embodiment, there is provided a non-image based autofocus system including an objective disposed to image a sample; a movable carriage; an illumination source configured to emit an autofocus beam to the sample via the objective, the illumination source disposed on the movable carriage; and an imaging detector configured to capture an image of the sample and configured to receive the autofocus beam incident thereon reflected from the sample.

BRIEF DESCRIPTION OF THE DRAWINGS

The above and other aspects will become more apparent by describing in detail embodiments thereof with reference to the attached drawings, in which.

DETAILED DESCRIPTION OF EMBODIMENTS

Aspects of the non-limiting embodiments relate to a position based autofocus system and method for infinity based microscopy imaging.

The systems according to the non-limiting embodiments may be configured to be very compact along the optical track, and thereby such systems may not demand axial gaps that are not present in conventional imaging systems. A non-limiting system may be configured to maximize the use of components present in an infinity based imaging microscope.

According to a non-limiting embodiment, only one component—a narrow beam illuminator—is incorporated into a conventional system to accomplish position based autofocus.

A laser source may be employed as a radiation source, but other radiation sources could be substituted such as, for example, one or more light emitting diodes (LEDs) capable of producing a narrow beam of radiation.

The terms laser-based autofocus and position-based autofocus may be interchangeably used throughout the present disclosure.

A non-limiting system may be configured to enable a user in the field of cellular biology to transform a microplate based imaging instrument from an image-based autofocus instrument to a position-based autofocus instrument.

Figure 4:
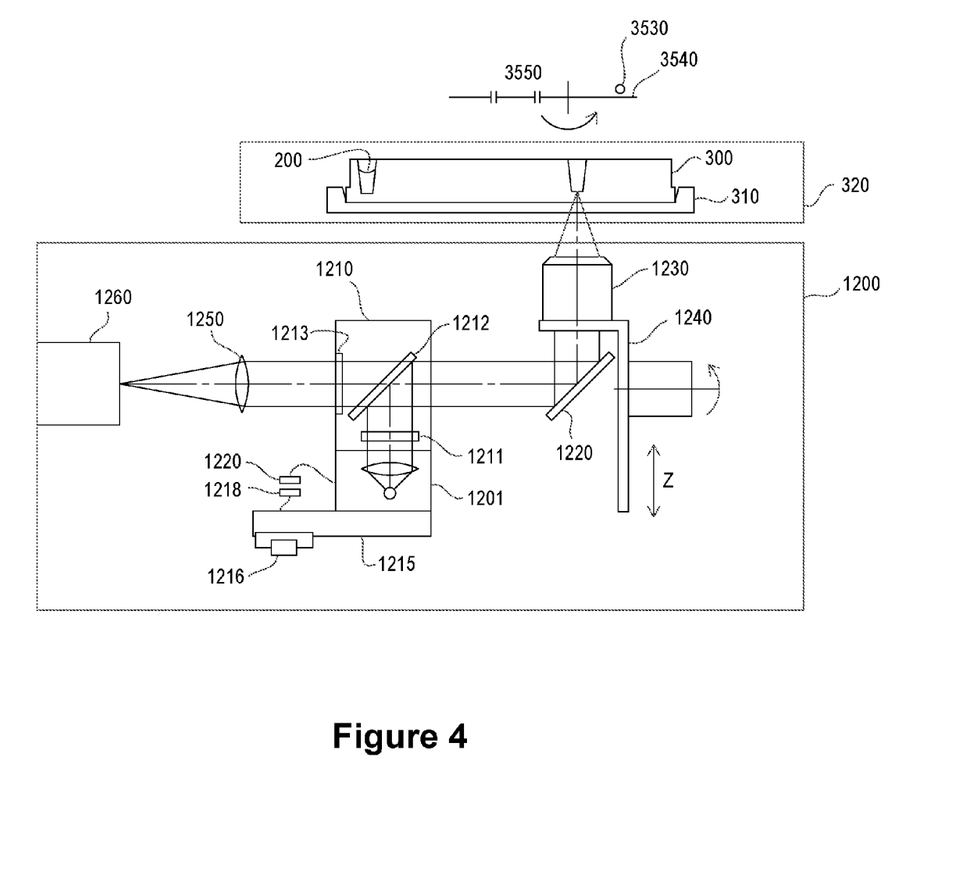
FIG. 4 illustrates optics of an imaging subsystem according to an embodiment of the present disclosure.

FIG. 4 illustrates optics of an imaging subsystem according to an embodiment of the present disclosure.

An infinity based microscope imaging system is described in Zimenkov et al., and is incorporated herein.

An objective 1230 may be configured for imaging the sample located near a bottom of a well of microplate 300. The emissions exiting objective 1230 may be collected via tube lens 1250 onto detector 1260. Such beam of light emanating from the objective and incident onto tube lens 1250 is parallel (e.g., image of sample after objective is at an infinite distance from objective), and thus the system may be termed an infinity based microscope system. An advantage of such system is that optical elements could be introduced into such parallel beam section without inducing optical aberrations to appear in the image or otherwise distort the image.

In FIG. 4, such elements are may be components of an epi-fluorescent optical system. Dichroic mirror 1212 sends excitation radiation towards the sample and emission filter 1213 passes emitted light to the detector via tube lens 1250. Such components may not introduce aberrations if placed in the parallel beam.

Excitation light is emitted from light source in cube 1201 via excitation filter 1211.

LEDs have appeared as light sources in imaging systems. Often, LEDs compose part of an external module and light is channeled to the imaging instrument via fiber or liquid light guide. A more direct path was taken in Lytle et al. (U.S. Pat. No. 7,502,164). In such design, the traditional epi fluorescence cubes also carried dedicated LEDs, to act as light sources for the specific cubes. The cubes are placed on a movable carriage and are individually presented to the optical imaging path. The LED is activated in this imaging path position. The movable carriage also carries power lines needed for electrical contact with LEDs, and a user may have convenient access to the cubes and power connectors.

A similar approach to epi fluorescence is described in Zimenkov et al. In such design, the LEDs cubes 1201 and cubes that contain optical filters 1210 and mirrors are separate entities.

A more detailed information regarding carriage and cube movement is provided with respect to FIG. 4.

The LEDs are housed in separate cubes 1201 that may be mixed and matched with filter cubes 1210. Multiple cubes may be located on a linearly driven common movable carriage 1215. Linear way 1216 assures smooth motion of the carriage. Carriage 1215 may be driven via timing belt of a lead screw or some other method. The carriage 1215 carries electrical lines 1218 via which power is provided for the LEDs via connectors 1220. The electrical lines to carriage may be provided by flexible electrical circuit or via flexible wires. The cubes 1201 and 1210 may be easily accessible by the user to enable instrument configuration changes.

The LEDs of the epi-fluorescence cubes require power similar to laser diodes requirements often used as the radiation source for creating a narrow beam of light for position based autofocus.

A traditional approach to incorporating laser-based autofocus to an imaging system, such as Zimenkov et al., might proceed as discussed above with respect to FIG. 2 (e.g., stationary dichroic inserted into optical line) or FIG. 3 (e.g., movable mirror changes configuration of the system to direct light into autofocus system). Both approaches, however, require space along the optical axis between epi fluorescence cubes 1210 and objective turret 1240. Such space is not always available nor is such space user accessible in imaging systems that are housed in gas tight housings like Zimenkov et al.

Both FIG. 2 and FIG. 3 illustrate detectors 3106 and 3206 that are part of laser autofocus system and are separate from the imaging detector 1260 of FIG. 4. The detector 1260 may be an imaging camera, CCD, or CMOS based detector. A typical imaging camera may have over one million pixels of the size of 3-6 μm.

Referring to FIG. 1, the laser beam reflected from sample surface 3005 falls onto detector 3012. The offset 3015 is an indication of how much sample surface shifted has from ideal focal position 3005 to position 3006 due to sample plane offset 3007.

Figure 5:
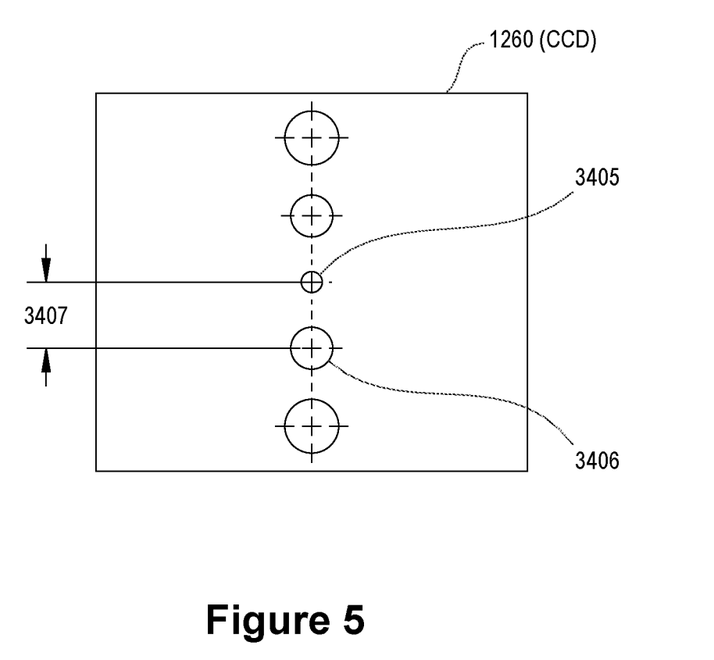
FIG. 5 illustrates a detector with patterns of reflected laser beam at different objective positions according to an embodiment of the present disclosure.

FIG. 5 illustrates a detector with patterns of reflected laser beam at different objective positions according to an embodiment of the present disclosure.

In FIG. 5, a combined series of five images of reflected laser beam on the detector (e.g., CCD) 1260 taken with five different values of offsets 3007 is illustrated. The offset 3407 on the detector correlates with sample plane offset 3007 along the objective's axis (i.e., Z-axis). The center circle 3405 on CCD corresponds to a Z-position of the objective on FIG. 1 when the sample is in optimal focus. As the sample is moved along the Z-axis, the position on CCD also moves, and typically increases in size, as indicated by FIG. 5. The spot 3406 offset from spot 3405 by 3407 corresponds to sample position 3006 in FIG. 1 that is offset from focus by offset 3007.

The imaging CCD detector 1260 may be configured as a position sensitive detector for a laser reflected spot, in additional to being used for the primary purpose as an imaging detector. There is thus potential to double the usage of the CCD camera as an autofocus detection component and avoid the need for other components that are dedicated to autofocus system, as in FIG. 2 (detector 3106) or FIG. 3 (detector 3206).

FIG. 1 illustrates that, to be useful as part of an auto focusing detection system, the laser beam must enter the objective parallel to optical axis, but at an offset 3002 from the optical axis. The sensitivity of the autofocus system is directly related to such offset. The sensitivity is defined as the relationship between reflected laser beam spot offset 3407 on the CCD to the sample plane offset 3007. The greater the offset 3407 on CCD for a given offset 3007, the higher the sensitivity of the system. Making the laser beam offset 3002 as large as possible may be considered, but the laser should pass into and out of the objective, which has limited aperture and the size of this aperture varies with objective, the limiting the laser beam offset 3002. It may be optimized for a design that allows the variability of the offset 3002 based on objective in use. A movable carriage 1215 of FIG. 4 provides such an optimized location.

Figure 6:
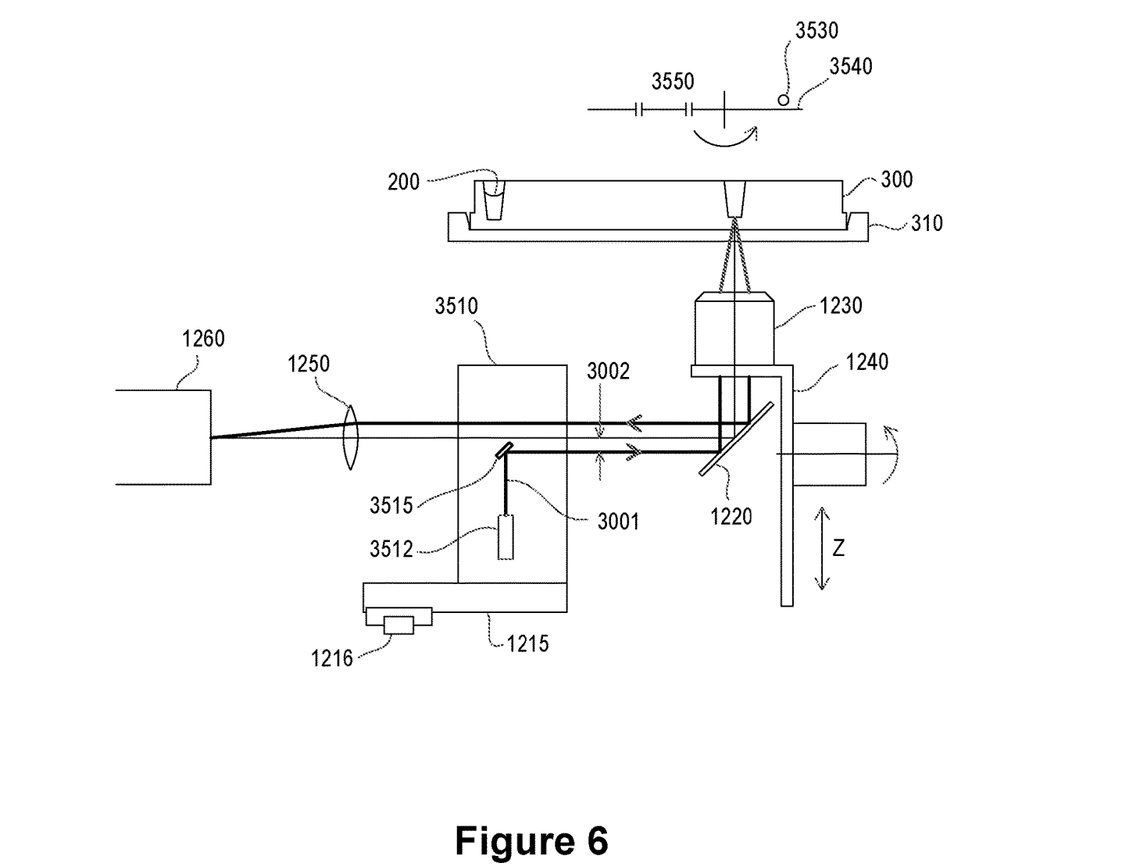
FIG. 6 illustrates a laser module disposed on a movable carriage according to an embodiment of the present disclosure.

FIG. 6 illustrates a laser module disposed on a movable carriage according to an embodiment of the present disclosure.

In FIG. 6, the carriage 1215 that caries epi fluorescence cubes and power lines for LED cubes may also carry a laser module for laser based autofocus. The carriage may be supported and guided by linear way 1216. The carriage is configured to enable switching between epi-fluorescence cubes for imaging at different wavelength, and various cubes may be present on the carriage. The laser cube may be designed be interchanged with one of the epi-cubes or designed to occupy a dedicated position on the carriage. The laser 3512 directs a laser beam 3001 towards objective 1230.

FIG. 6 illustrates in 2D that the beam is offset from optical axis by offset 3002, which is a pictorial simplification. In actual implementation, the laser beam may be centered along the optical axis and carriage 1215 motion may be employed to introduce and to vary offset 3002.

Figure 7:
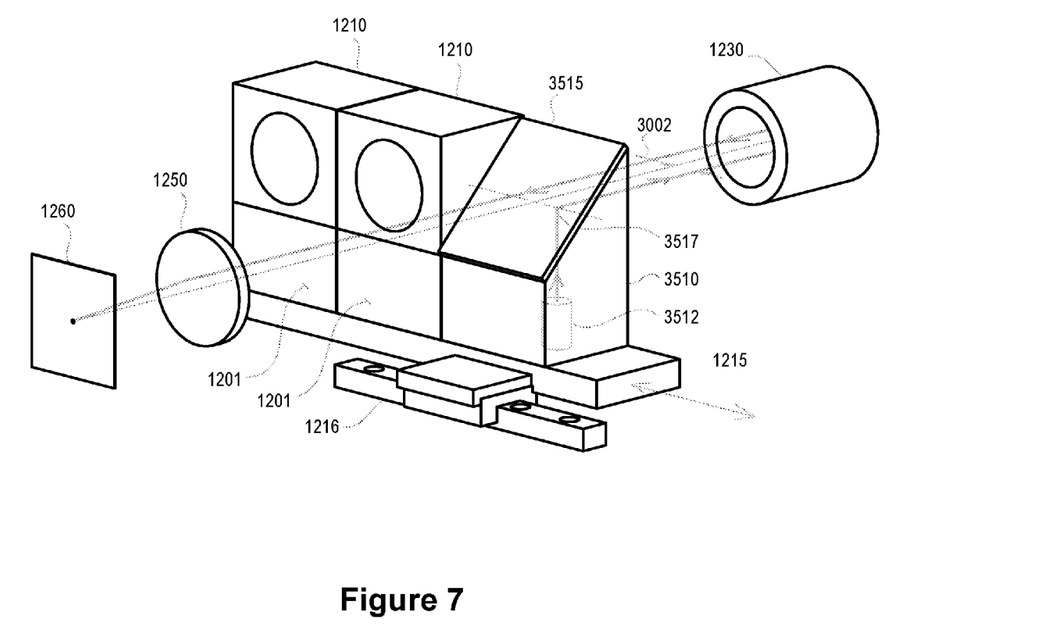
FIG. 7 illustrates an illumination module and epifluorescence cubes on a movable carriage according to an embodiment of the present application.

FIG. 7 illustrates an illumination module and epifluorescence cubes on a movable carriage according to an embodiment of the present application.

FIG. 7 illustrates carriage 1215 motion may be employed to introduce and to vary offset 3002. The offset 3002 may be introduced in the horizontal plane of FIG. 7. When laser beam 3001 is in line with optical axis of the objective 1230, the laser beam follows along the optical axis, offset 3002 is zero and this position is unsuitable for laser based autofocus. By moving the carriage 1215 along linear way 1216, an offset 3002 may be introduced, as shown in FIG. 7. The reflected laser beam now carries information regarding the sample plane offset 3007. Here, offset 3002 may be easily varied by moving carriage 1215. The offset may be adjusted to match various objectives 1230. Although the carriage 1215 and linear way 1216 may be adopted, other configurations might be employed, such as a circular or wheel configuration.

The offset may be selected based on clear aperture opening in the objective 1230. The offset 3002 controls the sensitivity of the autofocus, as mentioned above. The greater the offset the higher the sensitivity. As such, selection of the largest possible offset that the objective allows increases sensitivity. The carriage 1215 motion allows easy setting of the offset 3002.

Figure 8A:
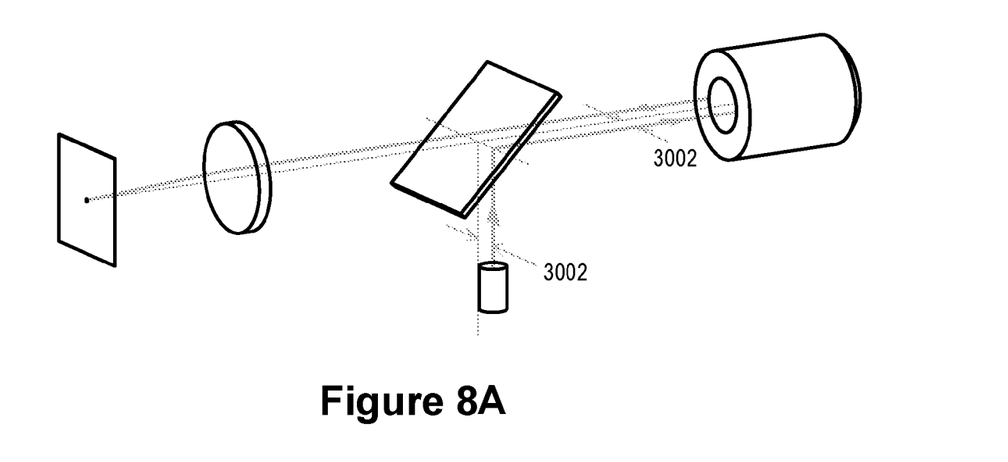
FIGS. 8A and 8B illustrate a narrow beam illumination module on a movable carriage with beam offset according to an embodiment of the present disclosure.
Figure 8B:
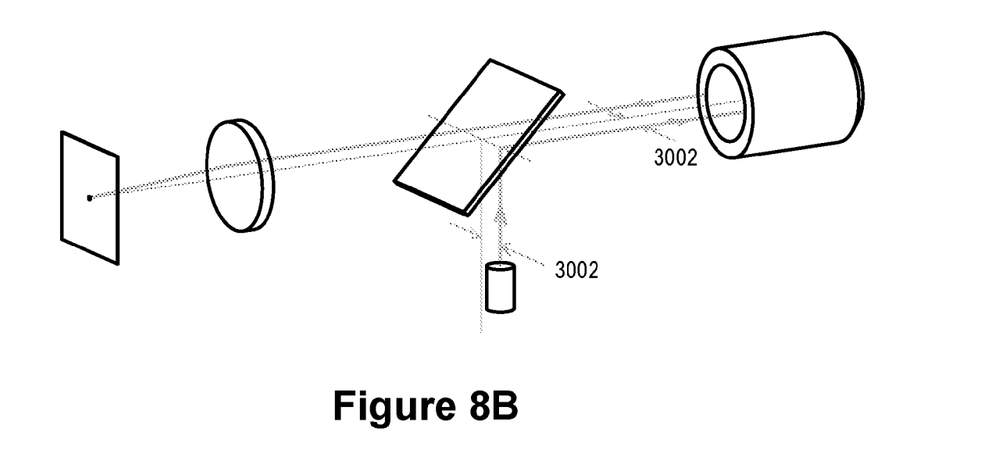

FIGS. 8A and 8B illustrate a narrow beam illumination module on a movable carriage with beam offset according to an embodiment of the present disclosure FIGS. 8A and 8B illustrate selected correlation between offset and objective's clear aperture: smaller in FIG. 8A and larger in FIG. 8B.

According to the non-limiting embodiment discussed above, advantages of the movable carriage 1215 that supports epi-fluorescence cubes 1210 as location for the laser module 3510 include ability to easily set the offset 3002 for laser based autofocus and the ability to present a mounting location for laser module 3510 to the user.

Herein, a user may place the laser module 3510 instead of one of the epi-fluorescence cubes 1210 or place it in a dedicated location on the carriage 1215. The remainder of the optical track is common to laser beam and to imaging rays, and detector 1260 may be used for both determining offset 3015 of a reflected laser beam and for sample imaging. An operator can thus, by adding a laser cube and software, transform an instrument that previously did not have laser based autofocus into an instrument with laser based autofocus.

Figure 9:
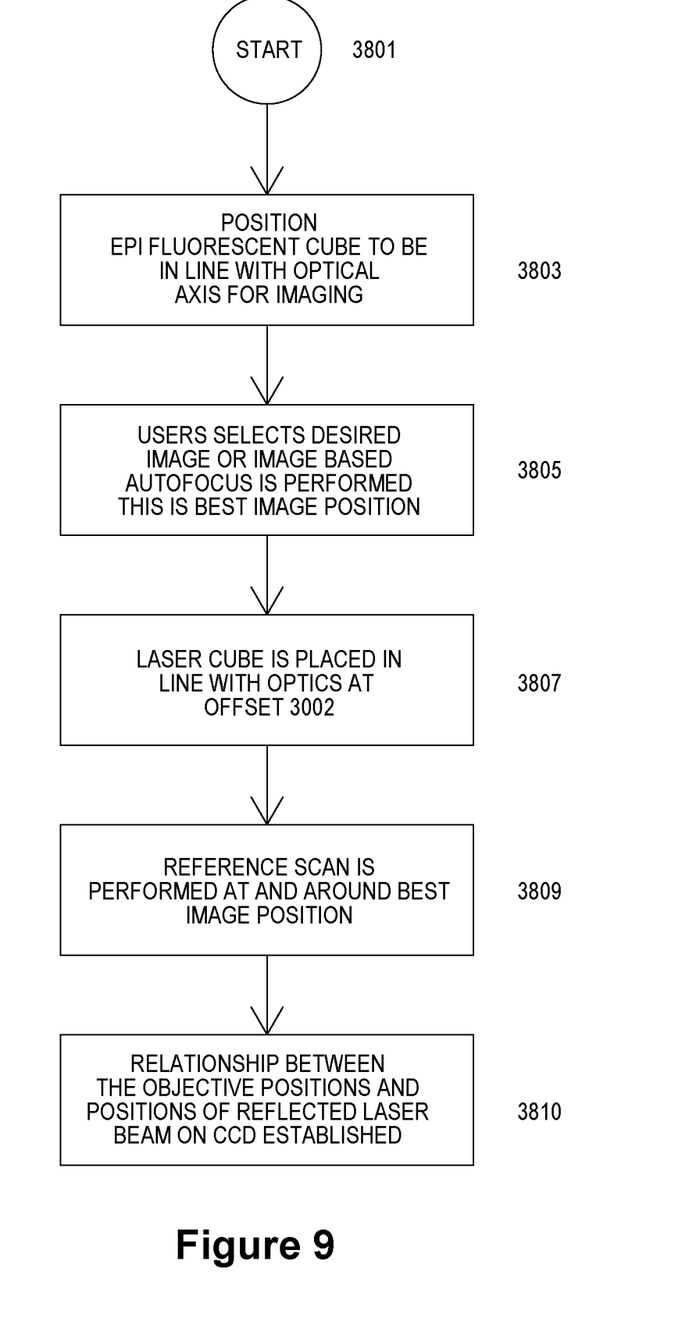
FIG. 9 illustrates a method of position-based autofocus training according to an embodiment of the present disclosure.
Figure 10:
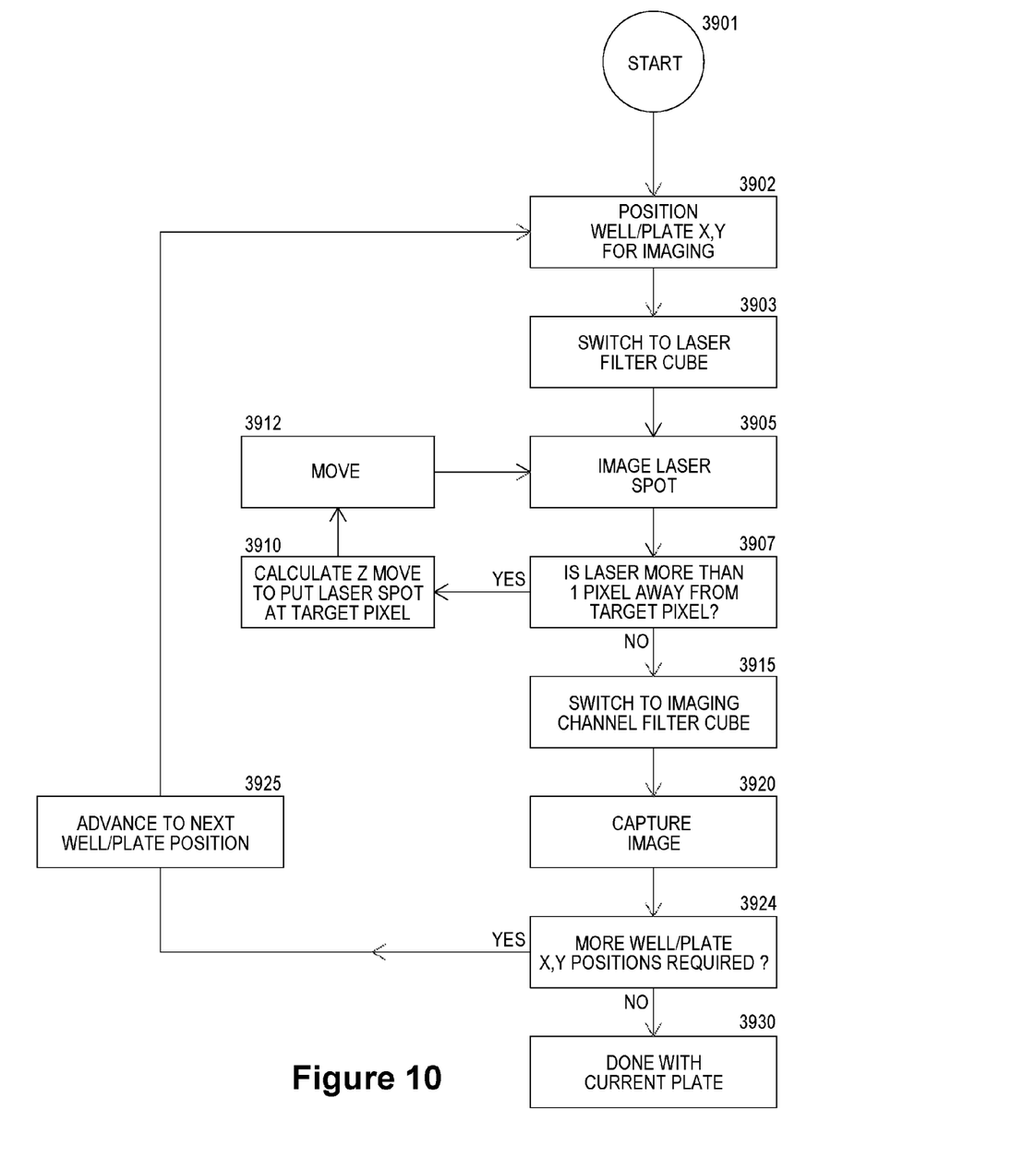
FIG. 10 illustrates a method of position-based autofocusing according to an embodiment of the present disclosure.

FIG. 9 illustrates a method of position-based autofocus training according to an embodiment of the present disclosure. FIG. 10 illustrates a method of position-based autofocusing according to an embodiment of the present disclosure.

In FIG. 9, in step 3803, the objective 1230, epi fluorescence cube 1210, and sample are positioned along the optical axis. In the case of bright field or phase contrast, the epi cube 1210 may not be needed in the optical path.

A user may manually focus the objective on a typical sample or an image based autofocus process is performed. The best image position for an objective along Z-axis is thus determined, in step 3805.

The instrument removes the epi cube from interference and positions laser based cube 3510 at offset 3002 that is specific to the objective, in 3807.

A laser is activated and an image of a reflected laser beam on the CCD is captured. This is the image of reflected beam that corresponds to the objective's Z-axis identified as the location at which the sample image is sharpest (i.e., best, optimal image position of Z-axis). The pattern on CCD 3405, e.g., FIG. 5, is the best image reflected pattern. A scan of the Z-axis is then performed around the best image position. A series of images of the reflected beam on the detector is captured. The images on the CCD may appear as in FIG. 5. Five reflected laser beam patterns corresponding to five Z locations are shown. The center image 3405 corresponds to the Z location at which best visual focus is determined (i.e., the best image reflected pattern), in 3809.

The relationship between the objective's position and positions of reflected laser beam on CCD detector is thus determined. There may be only one reflected beam pattern 3405 (e.g., center pattern) that corresponds to the Z location at which the image would be the sharpest. The four other reflection patterns may be used for determining orientation of a current Z location relative to the ideal focus position, in 3810.

If, subsequently, the sample may be shifted up or down, the laser reflected pattern on CCD will also change from ideal pattern 3405 of FIG. 5. Achieving a pattern for laser reflected spot on CCD that matched the pattern 3405 found in training step 3809 by moving objective in Z would result in a found a Z position in which an image for this shifted sample position should be taken. Thus, the imaging process determines a Z location at which the reflected beam pattern matches the best image pattern found during training step, such as center pattern 3405 of FIG. 5 of the scan performed in 3809.

FIG. 10 describes the image processing.

At the start, for each picture, a sample may be positioned at XY coordinates, in 3902.

A laser cube may be positioned in the optics with offset 3002 used in 3807, in 3903.

An image of a reflected laser spot is taken, in 3905.

In 3907, it may be determined whether the location of pattern of current reflected laser spot matches the location of ideal pattern taken in 3809. A criteria for matching centers of patterns may be one pixel. The match may be evaluated by various mathematical means. A cross correlation technique is one deployed in the preferred embodiment.

If a pattern match is found, a laser cube 3510 may be positioned from interfering, and an epi-cube may be introduced into the optics channel, in 3915.

The sample image is captured in 3920, and the system moves on to the next well or next XY position on the same well, or the carrier may remain in place if a same image is to be retaken after time interval (e.g., kinetic study or movie).

If pattern matching in 3907 was unsuccessful, the software, based on series of patterns stored during training 3809, determines the most probable Z location to which objective 1230 is to be moved for a reflected laser beam pattern to match the best image reflected pattern. This process iterates until patterns match to within one pixel. An abort (i.e., error) would be issued if multiple attempts at matching the pattern failed, but a sample image may be taken regardless of error at the best possible matching Z position and an image flagged as questionable such that an image is still taken even if focusing criteria failed.

An important imaging technique is bright field imaging and phase contrast imaging. These techniques work in trans illuminated light coming from light source 3530 in FIG. 6. The ring aperture 3550 may be used in phase contrast imaging.

A laser cube may be configured in which laser beam 3001 is directed to objective via small section of the reflector 3515 that directs laser beam to the sample and passes reflected beam to detector 1260. The part 3515 could be completely transparent except small reflecting spot 3517. Many different designs may be deployed to send the laser towards the sample while allowing reflected beam to pass onto the tube lens 1250 and to detector 1260, such as a small mirror and open space, a dichroic, neutral density filter and others. Ideally the beam will not be attenuated from the sample to the detector, to allow for the minimum of laser energy delivered to the sample while still focusing.

Both bright field and phase contrast do not require an epi fluorescence cube to be in the optical path during imaging. In this case, a more rapid series of laser based auto focuses and imaging steps may be performed because no motion to interchange laser cube 3510 and epi fluorescence cubes 1210 would be required. The light alternates between laser 3512 in cube 3510 and imaging light source 3530. The sample image will be taken immediately following laser based autofocus after laser is deactivated.

The methods and systems discussed above may be implemented in hardware, software, and any combination of hardware and software. For example, systems described above may be implemented to include one or more processors or controller (e.g., CPU, microcontroller, microprocessor, etc.) that execute computer-readable instructions stored in a computer-readable memory (e.g., ROM, RAM, flash, etc.). The computer-readable instructions may be provided as machine-readable algorithms that cause execution of the algorithms discussed above with respect to the systems and flowcharts.

Embodiments described above demonstrate a position based autofocus system that fits into space reserved for regular imaging components of an infinity based microscope system and does not require additional axial gaps between components along optical track.

Embodiments described above add a single new narrow beam module (to accomplish position based autofocus) to the conventional components for imaging functionality.

Embodiments described above allow a user to easily upgrade an imaging system from image based autofocus to positional sensing autofocus.

What is claimed is:

1. A non-image based autofocus system comprising:
   an objective disposed to image a sample;
   a movable carriage;
   an illumination source configured to emit an autofocus beam to the sample via the objective, the illumination source disposed on the movable carriage; and
   an imaging detector configured to capture an image of the sample and configured to receive the autofocus beam incident thereon reflected from the sample.

2. The system of claim 1, further comprising:
   a controller configured to control positioning of the movable carriage to position the illumination source to emit the autofocus beam parallel and in offset to an optical axis of the objective.

3. The system of claim 2, wherein the offset is variable.

4. The system of claim 3, further comprising:
   a light source configured to emit illumination to the sample for capturing the image of the sample.

5. The system of claim 4, wherein the light source is disposed on the movable carriage.

6. The system of claim 5, wherein the controller is further configured to:
   control the positioning of the movable carriage to position the illumination source in a first position; and
   control the positioning of the movable carriage to position the light source in a second position.

7. The system of claim 6, wherein the light source is used for epi-fluorescence imaging of the sample.

8. The system of claim 7, wherein the light source is a light emitting diode (LED) light source.

9. The system of claim 7, wherein the movable carriage comprises electrical connections configured to supply power to the light source and the illumination source.

10. The system of claim 4, wherein the light source is fixedly disposed above the sample.

11. The system of claim 10, wherein the controller is further configured to:
    control activation of the illumination source; and
    control activation of the light source to illuminate the sample for capturing the image of the sample.

12. The system of claim 11, wherein the controller is further configured to:
    control deactivation of the illumination source once the non-image based autofocus system is focused; and
    control activation of the light source to illuminate the sample for capturing the image of the sample once the illumination source is deactivated.

13. The system of claim 12, wherein the light source is a light source for bright field imaging or phase contrast imaging.

* * * * *